United States Patent
Otomo

(10) Patent No.: US 6,396,640 B2
(45) Date of Patent: May 28, 2002

(54) COLLIMATOR LENS AND OPTICAL SCANNING APPARATUS USING THE SAME

(75) Inventor: Ryoko Otomo, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/818,598

(22) Filed: Mar. 28, 2001

(30) Foreign Application Priority Data

Mar. 30, 2000 (JP) ........................................ 2000-093867

(51) Int. Cl.$^7$ ..................... G02B 27/30; G02B 26/08; G02B 9/60; G02B 9/34
(52) U.S. Cl. ..................... 359/641; 359/205; 359/764; 359/772
(58) Field of Search ............................. 359/641, 205, 359/763, 764, 772, 774

(56) References Cited

U.S. PATENT DOCUMENTS 6,014,262 A * 1/2000 Noda ........................... 359/641

OTHER PUBLICATIONS

Japanese Patent Office, "Japanese Unexamined Patent Publication No.: 61–147225," Date of Publication: Jul. 4, 1986, Application No.: 59–268275, Filing Date: Dec. 21, 1984, pp. 151–154 (English Language Abstract).

Japanese Patent Office, "Japanese Unexamined Patent Publication No. 61–173214," Date of Publication: Aug. 4, 1986, Application No.: 60–13952, Filing Date: Jan. 28, 1985, pp. 71–75 (English Language Abstract).

Japanese Patent Office, "Japanese Unexamined Patent Publication No. 11–271606," Date of Publication: Oct. 8, 1999, Application No: 10–92620, Filing Date: Mar. 20, 1998, pp. 1–7 (English Language Abstract).

* cited by examiner

*Primary Examiner*—Scott J. Sugarman
(74) *Attorney, Agent, or Firm*—Snider & Associates; Ronald R. Snider

(57) ABSTRACT

A collimator lens comprises, successively from a parallel luminous flux side, a first lens having a positive refracting power, second and third lenses having a negative composite refracting power, a fourth lens having a positive refracting power, and a fifth lens having a positive refracting power. The second and third lenses are cemented together. One of the second and third lenses has a negative refracting power, whereas the other has a positive refracting power. The collimator lens further satisfies $Bf/f>0.6$, where $Bf$ is the back focus of the whole lens system, and $f$ is the focal length of the whole lens system.

11 Claims, 6 Drawing Sheets

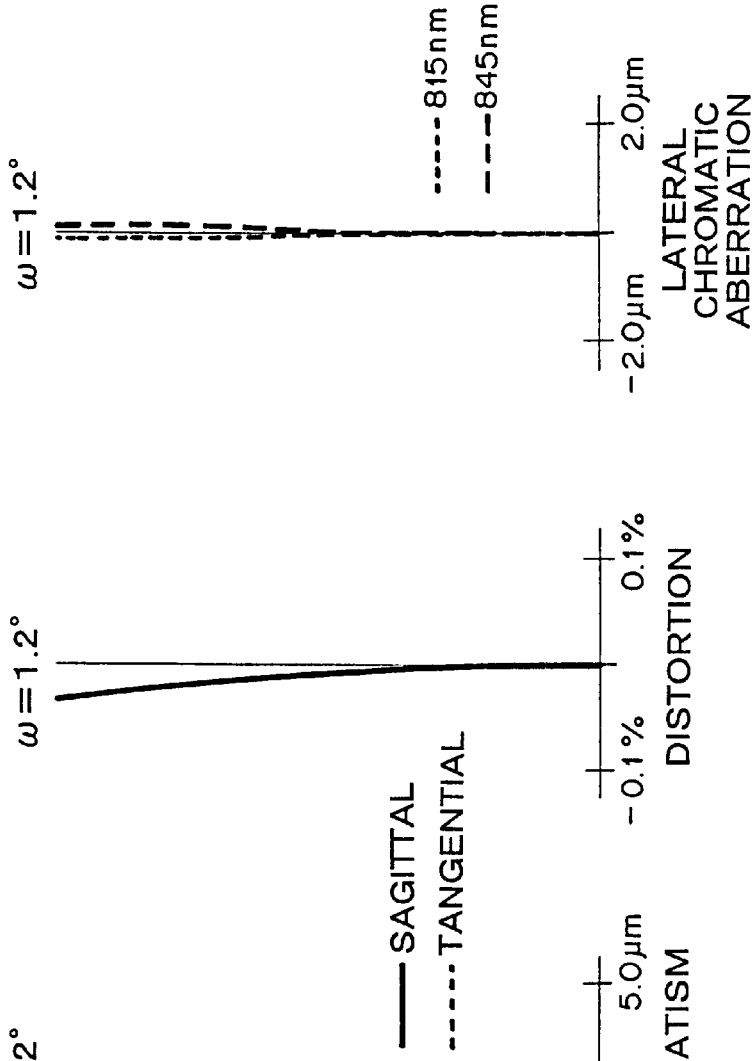

EXAMPLE 1
COMA 1.2°

EXAMPLE 1
COMA 0.8°

EXAMPLE 1
COMA 0.6°

EXAMPLE 1
COMA 0°

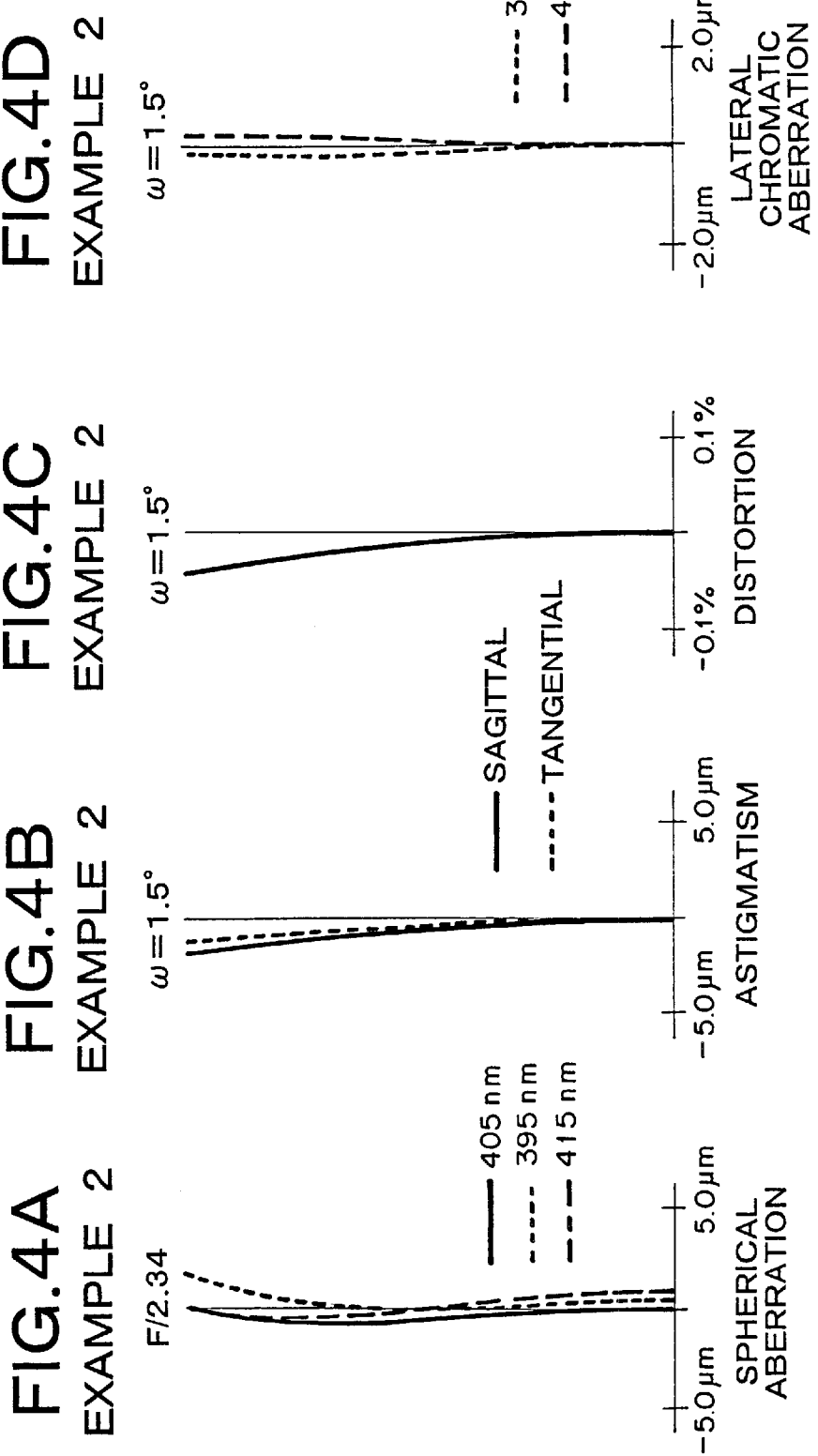

EXAMPLE 2
COMA
1.5°

EXAMPLE 2
COMA
1.1°

EXAMPLE 2
COMA
0.8°

EXAMPLE 2
COMA
0°

COLLIMATOR LENS AND OPTICAL SCANNING APPARATUS USING THE SAME

RELATED APPLICATIONS

This application claims the priority of Japanese Patent Application No. 2000-093867 filed on Mar. 30, 2000, which is incorporated herein by reference.

BACKGROUND OF THE INVENTION

1. Field of the Invention

The present invention relates to a collimator lens used in an optical scanning apparatus, such as copier or laser printer, which scans a laser beam so as to record or display an image; and, in particular, to a collimator lens for converting a divergent luminous flux emitted from a light source such as semiconductor laser into a parallel luminous flux, and an optical scanning apparatus using the same.

2. Description of the Prior Art

Various optical scanning apparatus, such as copier and laser printer, which scan laser beams so as to record or display images have conventionally been known.

Such an optical scanning apparatus is configured such that a laser beam emitted from a semiconductor laser is converted into a parallel luminous flux by a collimator lens, and is deflected as a rotary polygon mirror rotates, and thus deflected beam is focused onto an imaging plane by an fθ lens.

As collimator lenses used in general, many of those constituted by two or three lenses have been known as disclosed in Japanese Unexamined Patent Publication Nos. 61-173214 and 61-147225, since they are mainly required to satisfy axial performances.

Also, as a collimator lens which keeps the amount of curvature of field lower for multi-beam scanning, one constituted by five elements disclosed in Japanese Unexamined Patent Publication No. 11-271606 has been known.

However, the off-axis performances of the collimator lenses constituted by two or three lenses disclosed in the above-mentioned Japanese Unexamined Patent Publication Nos. 61-173214 and 61-147225 are only suitable in a very narrow range where the sine condition is satisfied. In particular, the collimator lenses disclosed in the above-mentioned publications are hard to apply to a case employing a multi-beam system aimed at accelerating the scanning speed or recording a plurality of different information items at the same time upon a single scanning operation, and the like, since the curvature of field is required to be less than 20 microns within the range where the half angle of view ω is about 2 degrees.

On the other hand, the collimator lens disclosed in Japanese Unexamined Patent Publication No. 11-271606 is disposed near the light source (laser diode or the like), so that its temperature is likely to rise due to the heat from the light source, whereby wavefront aberration may increase, for example.

SUMMARY OF THE INVENTION

In view of the circumstances mentioned above, it is an object of the present invention to provide a collimator lens used in an optical scanning apparatus which, when carrying out multi-beam scanning, can suppress various kinds of aberration, such as the amount of curvature of field in particular, to a very small level with respect to respective light beams from a plurality of light sources, and can secure a back focus sufficient for reducing the influence of the heat from the light sources.

For achieving the above-mentioned object, the collimator lens in accordance with the present invention comprises, successively from a parallel luminous flux side, a first lens having a positive refracting power, second and third lenses having a negative composite refracting power, a fourth lens having a positive refracting power, and a fifth lens having a positive refracting power, the second and third lenses being cemented together, one of the second and third lenses having a negative refracting power, the other having a positive refracting power; the collimator lens satisfying the following conditional expression (1):

$$Bf/f > 0.6 \tag{1}$$

where
Bf is the back focus of the whole lens system; and
f is the focal length of the whole lens system.

Preferably, the first lens is a positive lens having a convex surface directed onto the parallel luminous flux side, the fifth lens is a positive meniscus lens having a concave surface directed onto the light source side, and the collimator lens satisfies at least one of the following conditional expressions (2) to (4):

$$-0.54 < f_1/f_{23} < -0.36 \tag{2}$$

$$0.9 < f_{45}/f < 1.4 \tag{3}$$

$$0.9 < f_4/f_5 < 1.4 \tag{4}$$

where
f is the focal length of the whole lens system;
$f_1$ is the focal length of the first lens;
$f_4$ is the focal length of the fourth lens;
$f_5$ is the focal length of the fifth lens;
$f_{23}$ is the composite focal length of the second and third lenses; and
$f_{45}$ is the composite focal length of the fourth and fifth lenses.

The optical scanning apparatus in accordance with the present invention uses the above-mentioned collimator lens.

The optical scanning apparatus in accordance with the present invention may carry out multi-beam scanning.

The optical scanning apparatus in accordance with the present invention may be a laser printer or a copier.

BRIEF DESCRIPTION OF THE DRAWINGS

FIGS. 2A to 2D are aberration charts (showing spherical aberration, astigmatism, distortion, and lateral chromatic aberration) of the collimator lens in accordance with Example 1;

FIGS. 4A to 4D are aberration charts (showing spherical aberration, astigmatism, distortion, and lateral chromatic aberration) of the collimator lens in accordance with Example 2;

DESCRIPTION OF THE PREFERRED EMBODIMENTS

In the following, the collimator lens and optical scanning apparatus in accordance with an embodiment of the present invention will be explained with reference to Examples 1 and 2 in view of the drawings.

Figure 1:
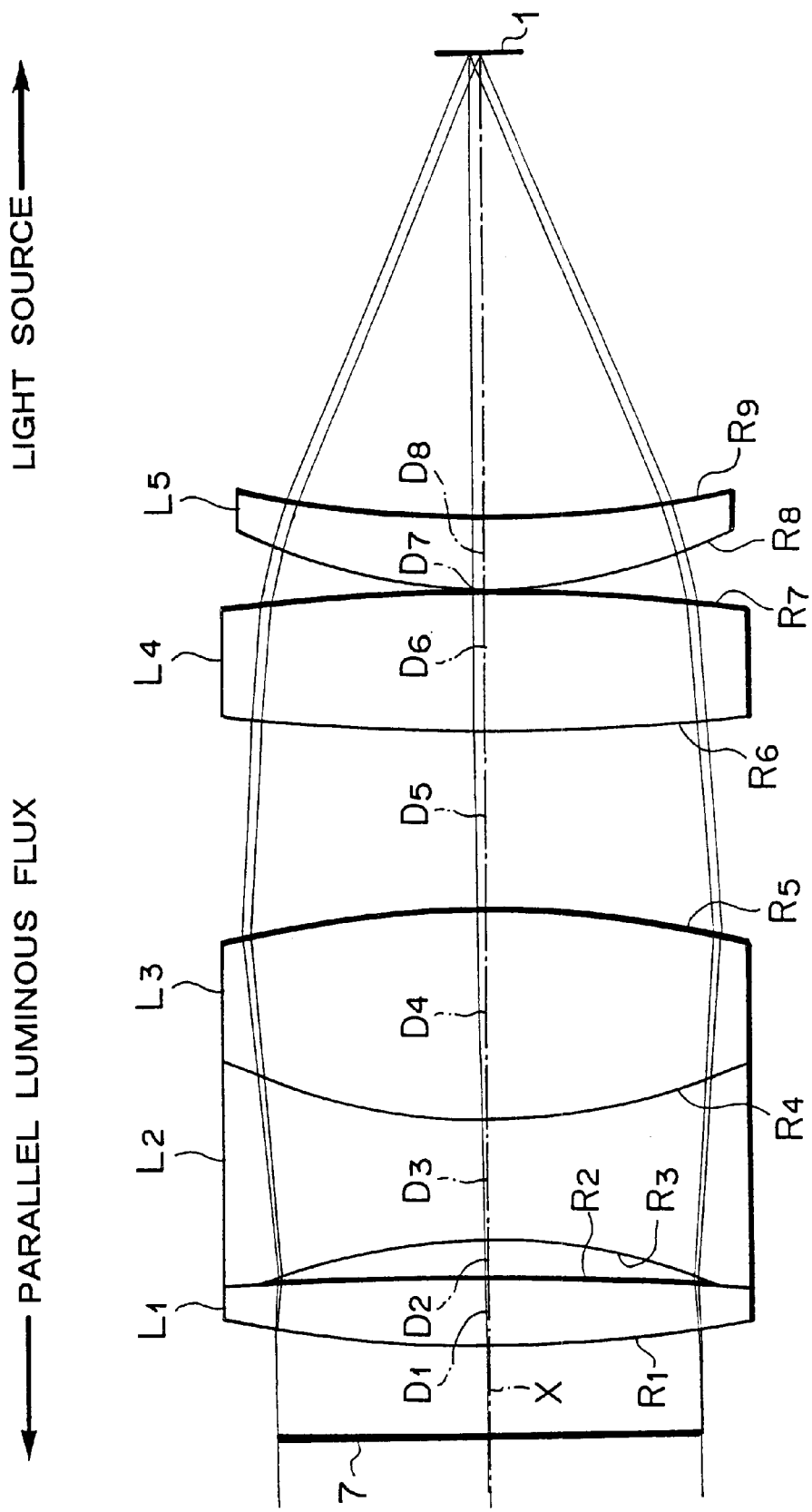
FIG. 1 is a schematic view showing a basic lens configuration of the collimator lens in accordance with an embodiment of the present invention.
Figure 3A:
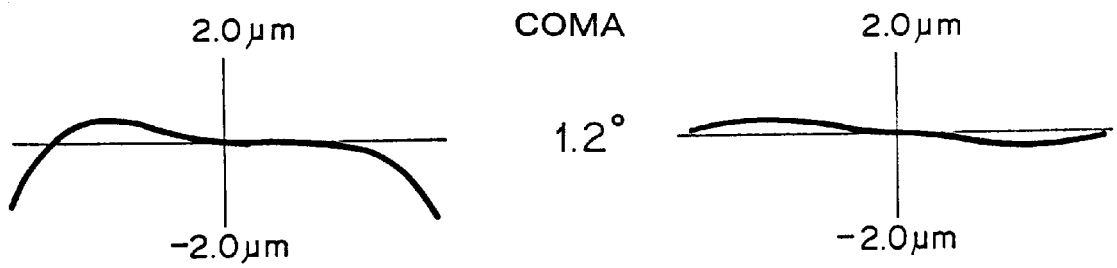
FIGS. 3A to 3D are aberration charts showing coma of the collimator lens in accordance with Example 1.
Figure 3B:
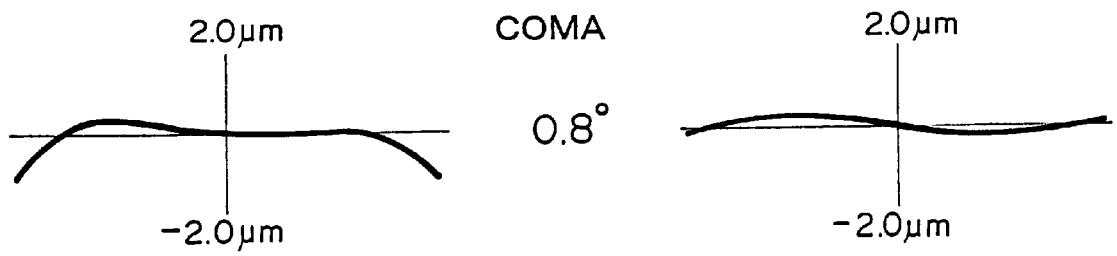
Figure 3C:
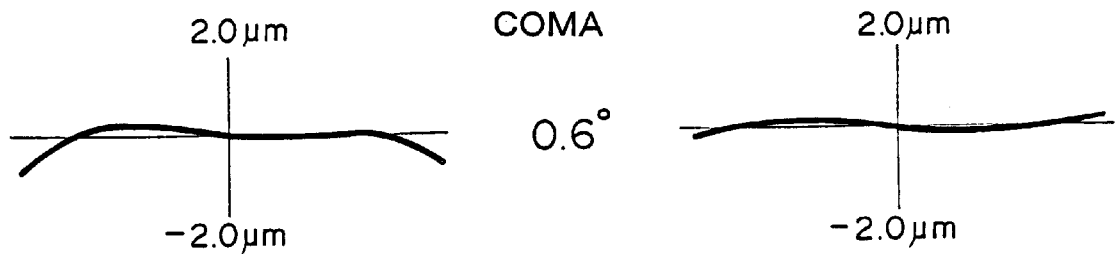
Figure 3D:
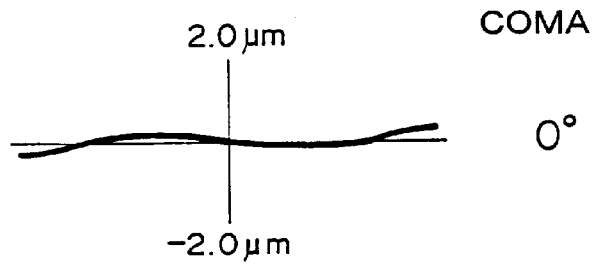
Figure 5A:
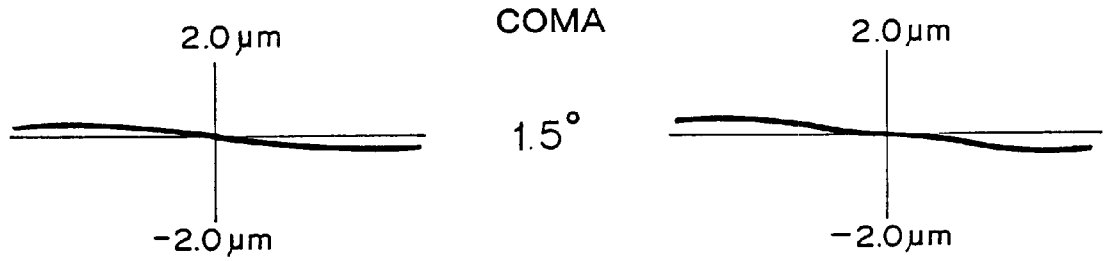
FIGS. 5A to 5D are aberration charts showing coma of the collimator lens in accordance with Example 2.
Figure 5B:
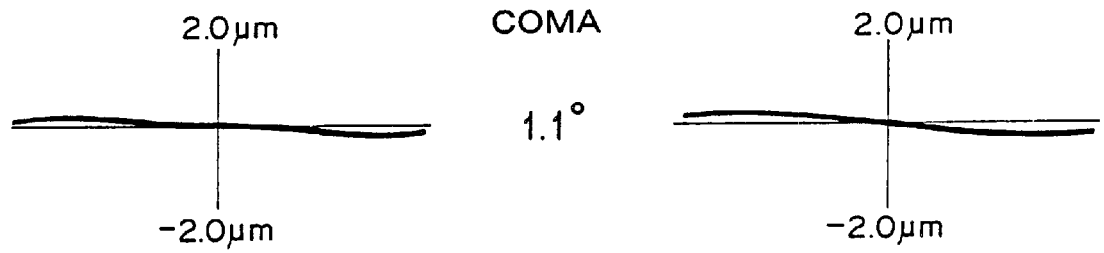
Figure 5C:
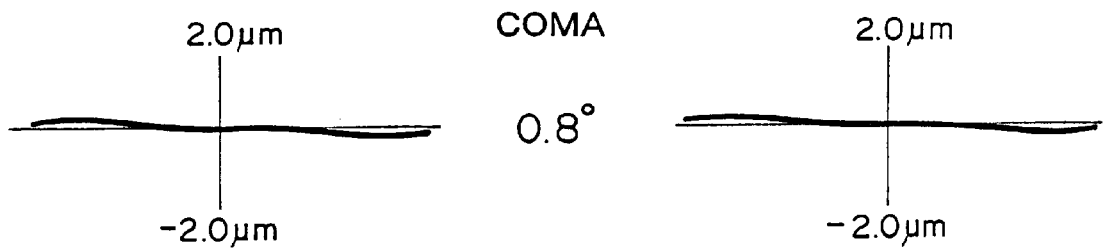
Figure 5D:
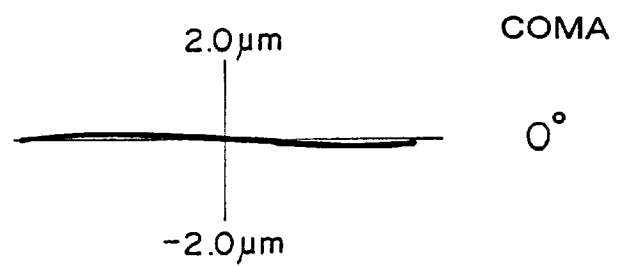
Figure 6:
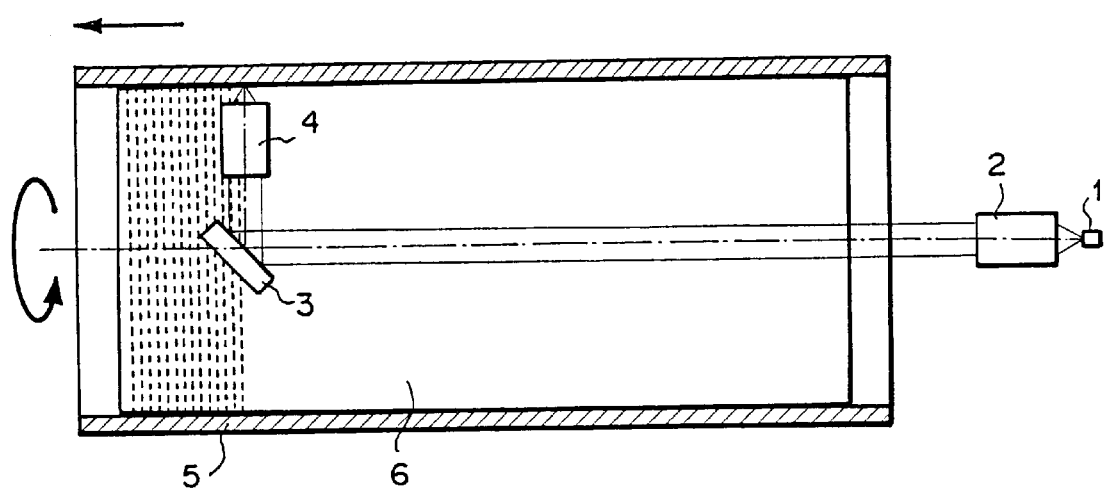
FIG. 6 is a schematic view showing the configuration of an optical scanning apparatus using the collimator lens in accordance with an embodiment of the present invention.

FIG. 1 is a view showing the basic lens configuration of the collimator lens in accordance with an embodiment of the present invention (represented by one corresponding to Example 1), whereas FIG. 6 is a schematic view showing the configuration of an optical scanning apparatus using the collimator lens shown in FIG. 1.

The collimator lens in accordance with the present invention is used in an optical system of an optical scanning apparatus such as laser printer or copier which scans a laser beam emitted from a light source in order to record or display images.

As shown in FIG. 6, this optical scanning apparatus comprises a collimator lens for converting a laser beam emitted from a light source 1 constituted by a one-chip semiconductor laser of double light source type or the like into a parallel luminous flux; and a cylinder 5, rotatable about the optical axis of collimator lens 2, having an inner face provided with a sensitive material 6. Disposed within the cylinder 5 are a mirror 3 for reflecting the luminous flux converted by the collimator lens 2, and a condenser lens 4 for guiding to the inner face of the cylinder 5 the luminous flux reflected by the mirror 3. In FIG. 6, the cylinder 5 is represented by its cross section in a plane including the optical axis of collimator lens 2.

In this optical scanning apparatus, the laser beam emitted from the light source 1 is converted into a parallel luminous flux by the collimator lens 2, so as to be guided into the cylinder 5 and reflected by the mirror 3, and then is turned into a minute beam spot by the condenser lens 4, with which the sensitive material 6 disposed on the inner face of cylinder 5 is scanned.

As shown in FIG. 1, the collimator lens 2 in accordance with this embodiment comprises, successively from the parallel luminous flux side, a first lens $L_1$ made of a biconvex lens (a plane-convex lens having a convex surface directed onto the parallel luminous flux in Example 2), a second lens $L_2$ made of a biconcave lens, a third lens $L_3$ made of a biconvex lens, a fourth lens $L_4$ made of a biconvex lens, and a fifth lens $L_5$ made of a positive meniscus lens having a concave surface directed onto the light source side. The second lens $L_2$ and third lens $L_3$ are cemented together. Further, a stop 7 is disposed on the parallel luminous flux side of the first lens $L_1$. In FIG. 1, the light source is indicated by 1, whereas the optical axis is indicated by X.

These lenses satisfy the following conditional expressions (1) to (4):

$$Bf/f > 0.6 \tag{1}$$

$$-0.54 < f_1/f_{23} < -0.36 \tag{2}$$

$$0.9 < f_{45}/f < 1.4 \tag{3}$$

$$0.9 < f_4/f_5 < 1.4 \tag{4}$$

where
Bf is the back focus of the whole lens system;
f is the focal length of the whole lens system;
$f_1$ is the focal length of the first lens;
$f_4$ is the focal length of the fourth lens;
$f_5$ is the focal length of the fifth lens;
$f_{23}$ is the composite focal length of the second and third lenses; and
$f_{45}$ is the composite focal length of the fourth and fifth lenses.

Preferably, these lenses also satisfy the following conditional expression (5):

$$\nu_{d+} - \nu_{d-} > 20.0 \tag{5}$$

where
$\nu_{d+}$ is the average value of Abbe number $\nu_d$ in all the positive lenses at d-line; and
$\nu_{d-}$ is the average value of Abbe number $\nu_d$ in all the negative lenses at d-line.

The significance of each of the above-mentioned conditional expressions will now be explained.

The above-mentioned conditional expression (1) defines the ratio of the back focus Bf of the whole system to the composite focal length f of the whole lens system, i.e., the value of Bf/f. If the value of Bf/f is less than the lower limit of conditional expression (1), then the distance from the light source 1 may not be secured sufficiently. As a consequence, components may alter their linear expansion and refractive index under the influence of the heat generated by the light source 1, whereby various kinds of aberration may not be corrected favorably, and the imaging position on the inner face of cylinder 5 may vary.

The above-mentioned conditional expression (2) defines the ratio of the focal length $f_1$ of the first lens $L_1$ to the composite focal length $f_{23}$ of the second lens $L_2$ and third lens $L_3$, i.e., the value of $f_1/f_{23}$. If the value of $f_1/f_{23}$ exceeds the upper limit of conditional expression (2), then the back focus may become too short, though it is advantageous for correcting various kinds of aberration. If the value of $f_1/f_{23}$ is less than the lower limit of conditional expression (2), by contrast, then the curvature of field may increase so that performances tolerant of use may not be satisfied, though a sufficient back focus is obtained. Hence, if conditional expression (2) is satisfied, then a predetermined back focus hard to be influenced by the heat from the light source 1 is secured, and the curvature of field can be corrected favorably.

The above-mentioned conditional expression (3) defines the ratio of the composite focal length $f_{45}$ of the fourth lens $L_4$ and fifth lens $L_5$ to the composite focal length f of the whole lens system, i.e., the value of $f_{45}/f$. If the value of $f_{45}/f$ exceeds the upper limit of conditional expression (3), then the amount of spherical aberration occurring in the fourth lens $L_4$ or fifth lens $L_5$ may become too much and hard to correct. If the value of $f_{45}/f$ is less than the lower limit, by contrast, then back focus may become too short. Hence, if conditional expression (3) is satisfied, then a predetermined back focus hard to be influenced by the heat from the light source 1 is secured, and spherical aberration can be corrected favorably.

The above-mentioned conditional expression (4) defines the ratio of the focal length $f_4$ of the fourth lens $L_4$ to the focal length $f_5$ of the fifth lens $L_5$, i.e., the value of $f_4/f_5$, and is a conditional expression for making off-axis coma favorable in particular. If the value of $f_4/f_5$ exceeds the upper limit of conditional expression (4), then the off-axis coma may deteriorate, so that performances tolerant of use may not be satisfied even when the curvature of field is corrected. If the value of $f_4/f_5$ is less than the lower limit, by contrast, the curvature of field may be corrected insufficiently, whereby the collimator lens may be harder to apply to a semiconductor laser having a large angle of view.

The above-mentioned conditional expression (5) defines the difference between the average value of all the positive lenses and that of all the negative lenses concerning the Abbe number $v_d$ at d-line, i.e., $v_{d+}$v$V_{d-}$. If the value of $v_{d+}$-$v_-$ is less than the lower limit of conditional expression (5), chromatic aberration may become greater. Hence, if conditional expression (5) is satisfied, various kinds of aberration can be corrected favorably even when the wavelength of light source 1 fluctuates, whereby a stable image quality can always be secured.

Examples 1 and 2 will now be explained with reference to specific values.

EXAMPLE 1

The following Table 1 shows the radius of curvature R (mm) of each lens surface, the center thickness of each lens and air space between neighboring lenses D (mm), and the refractive index N at a wavelength of 830 nm and Abbe number $v_d$ at d-line of each lens.

In Table 1 and its subsequent Table 2, numbers referring to letters R, D, N and $v_d$ successively increase from the parallel luminous flux side.

The lower part of Table 1 shows the values of the composite focal length f of the whole lens system, Bf/f, $f_1/f_{23}$, $f_{45}/f$, $f_4/f_5$, and $v_{d+}$-$v_{d-}$ in Example 1.

As can be seen from Table 1, all of conditional expressions (1) to (5) are satisfied in Example 1.

EXAMPLE 2

The following Table 2 shows the radius of curvature R (mm) of each lens surface, the center thickness of each lens and air space between neighboring lenses D (mm), and the refractive index N at a wavelength of 405 nm and Abbe number $v_d$ at d-line of each lens.

The lower part of Table 2 shows the values of the composite focal length f of the whole lens system, Bf/f, $f_1/f_{23}$, $f_{45}/f$, $f_4/f_5$, and $v_{d+}$-$v_{d-}$ in Example 2.

As can be seen from Table 2, all of conditional expressions (1) to (5) are satisfied in Example 2.

FIGS. 2A to 2D and FIGS. 4A to 4D show aberration charts (for spherical aberration, astigmatism, distortion, and lateral chromatic aberration) in Examples 1 and 2, respectively. FIGS. 3A to 3D and FIGS. 5A to 5D show aberration charts for coma in Examples 1 and 2, respectively. In these aberration charts, ω indicates the half angle of view. In Example 1, aberrations with respect to wavelengths of 815 nm, 830 nm, and 845 nm are shown in the spherical aberration chart, aberrations with respect to sagittal and tangential image surfaces are shown in the astigmatism chart, and aberrations with respect to wavelengths of 815 nm and 845 nm are shown in the lateral chromatic aberration chart. In Example 2, aberrations with respect to wavelengths of 395 nm, 405 nm, and 415 nm are shown in the spherical aberration chart, aberrations with respect to sagittal and tangential image surfaces are shown in the astigmatism chart, and aberrations with respect to wavelengths of 395 nm and 415 nm are shown in the lateral chromatic aberration chart.

As can be seen from these charts, each of the above-mentioned Examples can make all kinds of aberration favorable.

Without being restricted to the above-mentioned Examples, the collimator lens in accordance with the present invention can be modified in various manners. For example, the radius of curvature R of each lens and lens space (or lens thickness) D or the distance between the stop and first surface may be changed as appropriate.

Also, the optical scanning apparatus using the collimator lens in accordance with the present invention is not limited to that shown in FIG. 6. For example, it may be configured such that light is deflected as a rotary polygon mirror rotates, and then is focused onto an imaging plane by use of an fθ lens.

A stop is disposed near the focal position of the collimator lens, so that the luminous flux on the light source side is substantially telecentric. As a consequence, the deterioration in wavefront aberration caused by the eccentricity of light source or collimator lens or the deviation thereof in the optical axis direction can be reduced.

The collimator lens in accordance with the present invention may also be used as an objective lens aimed at forming an image of an object disposed on the parallel luminous flux side onto a recording medium, and collecting and scanning a laser beam at this image-forming position. For use as the objective lens, a predetermined distance is required between the lens and sensitive material, whereby a sufficient back focus is necessary.

The collimator lens in accordance with the present invention comprises, successively from a parallel luminous flux side, a first lens having a positive refracting power, second and third lenses having a negative composite refracting power, a fourth lens having a positive refracting power, and a fifth lens having a positive refracting power, the second and third lenses being cemented together, one of the second and third lenses having a negative refracting power, the other having a positive refracting power; and satisfies a predetermined conditional expression.

Therefore, when multi-beam scanning is carried out by use of one-chip semiconductor laser of double light source type or the like in the collimator lens in accordance with the present invention and the optical scanning apparatus using the same, various kinds of aberration, such as the amount of curvature of field in particular, can be made very small with respect to the light beam from each light source, whereby the quality of image formed by scanning can be improved in the case using a multi-beam system.

When the first lens is formed as a positive lens having a convex surface directed onto the parallel luminous flux side, the curvature of field can be corrected favorably. When the fifth lens is formed as a positive meniscus lens having a concave surface directed onto the light source side, a back focus sufficient for reducing the influence of the heat from the light source can be secured.

TABLE 1

| Surface | R | D | N(830 nm) | $v_d$ |
|---|---|---|---|---|
| stop | ∞ | 1.61 | | |
| 1 | 25.42 | 1.20 | 1.74358 | 52.3 |
| 2 | −80.12 | 0.69 | | |
| 3 | −11.02 | 2.16 | 1.82172 | 23.8 |
| 4 | 11.02 | 3.86 | 1.86661 | 40.8 |
| 5 | −19.43 | 3.20 | | |
| 6 | 38.67 | 2.54 | 1.76030 | 49.6 |
| 7 | −38.67 | 0.08 | | |
| 8 | 9.66 | 1.29 | 1.76030 | 49.6 |
| 9 | 21.44 | | | |
| f = 10.00 | Bf/f = 0.84 | $f_1/f_{23}$ = −0.39 | | |
| $f_{45}/f$ = 1.20 | $f_4/f_5$ = 1.17 | $v_{d+}$− $v_{d-}$ = 24.2 | | |

TABLE 2

| Surface | R | D | N(405 nm) | $\nu_d$ |
|---|---|---|---|---|
| stop | ∞ | 0.38 | | |
| 1 | 15.64 | 2.30 | 1.87382 | 37.2 |
| 2 | ∞ | 2.23 | | |
| 3 | −10.49 | 1.33 | 1.86408 | 25.5 |
| 4 | 23.94 | 4.00 | 1.77946 | 52.3 |
| 5 | −16.60 | 1.62 | | |
| 6 | 62.87 | 2.08 | 1.77946 | 52.3 |
| 7 | −22.75 | 0.25 | | |
| 8 | 9.08 | 1.10 | 1.77946 | 52.3 |
| 9 | 19.88 | | | |
| f = 10.00 | | Bf/f = 0.67 | | $f_1/f_{23}$ = −0.49 |
| $f_{45}/f$ = 1.06 | | $f_4/f_5$ = 1.06 | | $\nu_{d+} - \nu_{d-}$ = 23.0 |

What is claimed is:

1. A collimator lens comprising, successively from a parallel luminous flux side, a first lens having a positive refracting power, second and third lenses having a negative composite refracting power, a fourth lens having a positive refracting power, and a fifth lens having a positive refracting power, said second and third lenses being cemented together, one of said second and third lenses having a negative refracting power, the other having a positive refracting power; said collimator lens satisfying the following conditional expression (1):

$$Bf/f > 0.6 \tag{1}$$

where

Bf is the back focus of the whole lens system; and f is the focal length of the whole lens system.

2. A collimator lens according to claim 1, wherein said first lens is a positive lens having a convex surface directed onto the parallel luminous flux side, said fifth lens is a positive meniscus lens having a concave surface directed onto the light source side, and said collimator lens satisfies the following conditional expression (2):

$$-0.54 < f_1/f_{23} < -0.36 \tag{2}$$

where $f_1$ is the focal length of the first lens; and $f_{23}$ is the composite focal length of the second and third lenses.

3. A collimator lens according to claim 1, wherein said first lens is a positive lens having a convex surface directed onto the parallel luminous flux side, said fifth lens is a positive meniscus lens having a concave surface directed onto the light source side, and said collimator lens satisfies the following conditional expression (3):

$$0.9 < f_{45}/f < 1.4 \tag{3}$$

where f is the focal length of the whole lens system; and $f_{45}$ is the composite focal length of the fourth and fifth lenses.

4. A collimator lens according to claim 1, wherein said first lens is a positive lens having a convex surface directed onto the parallel luminous flux side, said fifth lens is a positive meniscus lens having a concave surface directed onto the light source side, and said collimator lens satisfies the following conditional expression (4):

$$0.9 < f_4/f_5 < 1.4 \tag{4}$$

where $f_4$ is the focal length of the fourth lens; and $f_5$ is the focal length of the fifth lens.

5. A collimator lens according to claim 1, wherein said first lens is a positive lens having a convex surface directed onto the parallel luminous flux side, said fifth lens is a positive meniscus lens having a concave surface directed onto the light source side, and said collimator lens satisfies the following conditional expressions (2) and (3):

$$-0.54 < f_1/f_{23} < -0.36 \tag{2}$$

$$0.9 < f_{45}/f < 1.4 \tag{3}$$

where f is the focal length of the whole lens system;

$f_1$ is the focal length of the first lens;

$f_{23}$ is the composite focal length of the second and third lenses; and $f_{45}$ is the composite focal length of the fourth and fifth lenses.

6. A collimator lens according to claim 1, wherein said first lens is a positive lens having a convex surface directed onto the parallel luminous flux side, said fifth lens is a positive meniscus lens having a concave surface directed onto the light source side, and said collimator lens satisfies the following conditional expressions (2) and (4):

$$-0.54 < f_1/f_{23} < -0.36 \tag{2}$$

$$0.9 < f_4/f_5 < 1.4 \tag{4}$$

where $f_1$ is the focal length of the first lens;

$f_4$ is the focal length of the fourth lens;

$f_5$ is the focal length of the fifth lens; and $f_{23}$ is the composite focal length of the second and third lenses.

7. A collimator lens according to claim 1, wherein said first lens is a positive lens having a convex surface directed onto the parallel luminous flux side, said fifth lens is a positive meniscus lens having a concave surface directed onto the light source side, and said collimator lens satisfies the following conditional expressions (3) and (4):

$$0.9 < f_{45}/f < 1.4 \tag{3}$$

$$0.9 < f_4/f_5 < 1.4 \tag{4}$$

where f is the focal length of the whole lens system;

$f_4$ is the focal length of the fourth lens; and $f_5$ is the focal length of the fifth lens.

8. A collimator lens according to claim 1, wherein said first lens is a positive lens having a convex surface directed onto the parallel luminous flux side, said fifth lens is a positive meniscus lens having a concave surface directed onto the light source side, and said collimator lens satisfies the following conditional expressions (2) to (4):

$$-0.54 < f_1/f_{23} < -0.36 \tag{2}$$

$$0.9 < f_{45}/f < 1.4 \tag{3}$$

$$0.9 < f_4/f_5 < 1.4 \tag{4}$$

where f is the focal length of the whole lens system;

$f_1$ is the focal length of the first lens;

$f_4$ is the focal length of the fourth lens;

$f_5$ is the focal length of the fifth lens;

$f_{23}$ is the composite focal length of the second and third lenses; and $f_{45}$ is the composite focal length of the fourth and fifth lenses.

9. An optical scanning apparatus using the collimator lens according to claim 1.

10. An optical scanning apparatus according to claim 9, wherein said optical scanning apparatus carries out multi-beam scanning.

11. An optical scanning apparatus according to claim 9, wherein said optical scanning apparatus is a laser printer or a copier.

* * * * *